Jan. 13. 1925.  1,522,825
F. LJUNGSTRÖM
PACKING MEANS FOR REGENERATIVE HEATING DEVICES
Filed Dec. 22, 1923
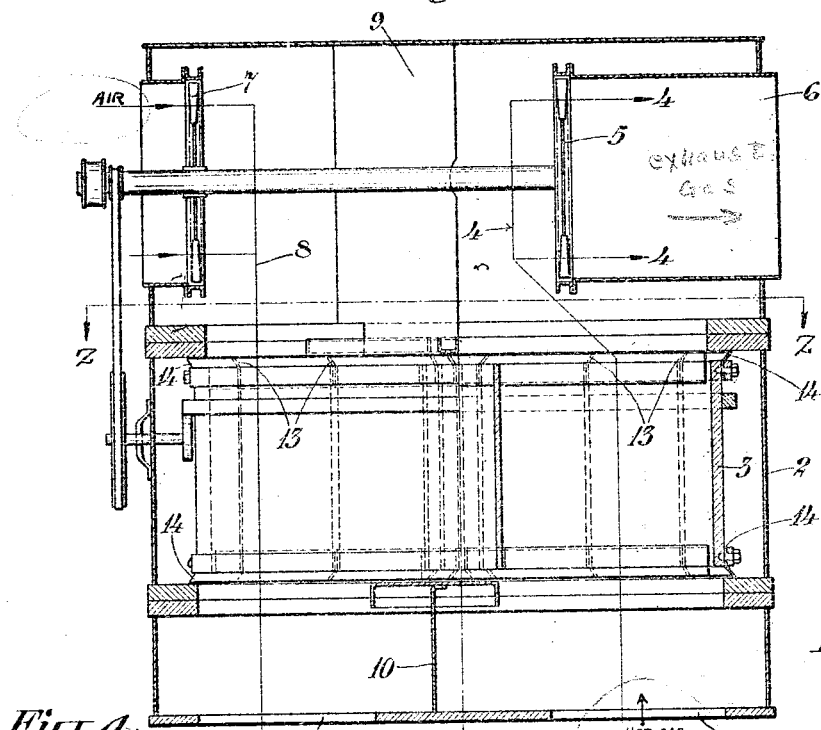
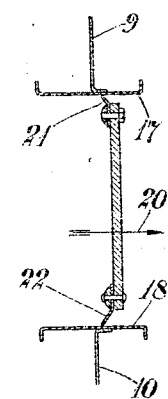
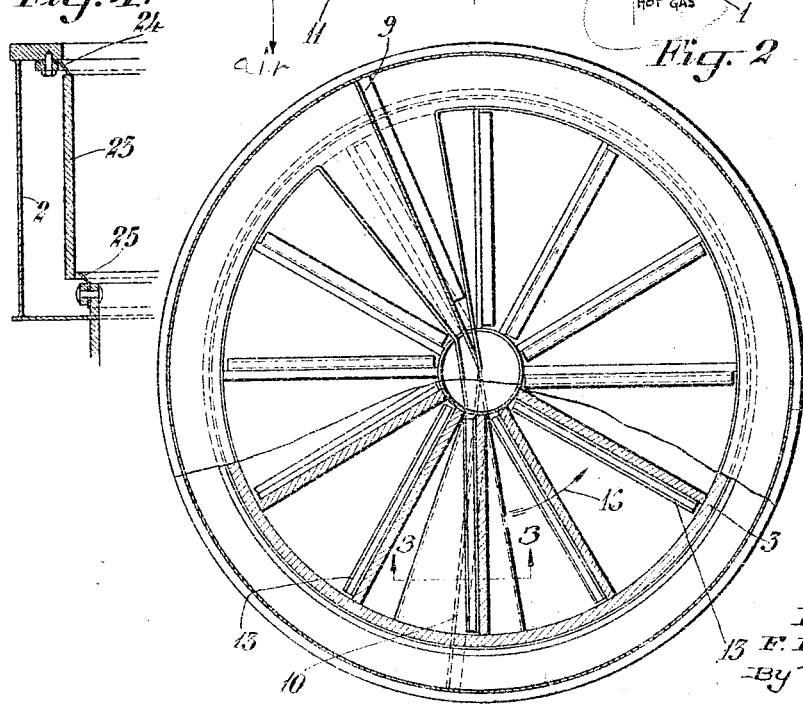
Inventor
F. Ljungström
By Marker Clerk
Attys.

Patented Jan. 13, 1925.

1,522,825

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ÅNGTURBIN, OF LIDINGO-BREVIK, SWEDEN.

PACKING MEANS FOR REGENERATIVE HEATING DEVICES.

Application filed December 22, 1923. Serial No. 682,349.

*To all whom it may concern:*

Be it known that I, FREDRIK LJUNGSTRÖM, subject of the King of Sweden, residing at Lidingo-Brevik, Sweden, have invented certain new and useful Improvements in Packing Means for Regenerative Heating Devices, of which the following is a specification.

Regenerative heating devices for taking up heat from a gas or liquid and for delivering said heat to another gas or liquid are previously known. Such devices may consist of movable parts, preferably rotatable in relation to each other. A preferred embodiment of such a regenerative heating device consists of a cylindrical frame containing regenerative material and rotating, on the one hand, in the fluid which has to give off heat and, on the other hand, in the fluid which has to receive the heat. This frame or rotor may be continuously driven, and fans may be arranged for moving the fluid, especially gas, through the rotor, which fans may be driven from the same driving motor as the rotor.

As the rotor passes alternately through the fluids between which the heat transmission takes place, it is very necessary to prevent, as far as possible, the gases from passing from the one channel into the other. It is evident that in plants where heat is taken from the exhaust gases of the boiler furnace, said gases should be prevented from entering the channel for the air to be heated. In some cases a small leakage from the one channel to the other may be permitted without the pre-heated air being considerably contaminated thereby, for instance when such air is used for the combustion in the furnace. However, a higher efficiency of the pre-heating device is of course obtained, if such mingling of the gases may be obviated. If the pre-heated air is to be used for other purposes, when it should be absolutely free or approximately free from foreign matter, for instance when the air is used for drying pulp or other sensitive material, packing means should be arranged between the different channels. In order to prevent the exhaust gases from leaking into the air channel, certain packing means have been previously proposed, comprising loosely-arranged parts resting partly on the stationary parts and partly on the movable parts, tightening being effected by means of said parts abutting against each other. Similar packing means have also been used at the outer mantle of the rotor, in order to prevent the exhaust gases from passing out laterally of the rotor. Experiments, however, have shown that such packing means could not bring about the desired tightening effect, disregarding the fact that they cause an intense noise. Further, by the packing means resting on the movable parts the rotor was braked by friction, thus requiring an increase of the driving power. It has even appeared to be more advantageous not to use any packing means at all of the kind described above. Moreover, difficulties have always arisen in providing entirely efficient packing means, as the rotor is always subjected to a varying expansion, the same moving through gases of different temperatures, so that in a certain position the packing parts had to suffer too great a bearing strain, while in another position leakage would arise.

The present invention refers to such pre-heating devices and has for its object to provide packing means which bring about an effective tightening effect and cause little or no resistance against the rotation of the rotor. The invention consists in thin lips or edges preferably of sheet iron, or the like which are fixed to one or both of the parts moving in relation to each other, and which project against the other part, said lips or edges being adapted to extend wholly or partly beyond the spaces providing clearance between the parts moving relatively to each other.

Some embodiments of the invention are shown in the accompanying drawings.

Figs. 1 and 2 illustrate respectively a vertical longitudinal sectional view and a transverse sectional view taken on line 2—2 of Figure 1 showing a pre-heating apparatus adapted to be used for instance in a boiler plant. Figs. 3 and 4 show how the packing is attached to the rotor. In these figures, 1 is the opening in the rotor casing 2 to which the channel is connected through which the exhaust gases from the boiler pass, said gases passing through the rotor 3 of the pre-heating device in the direction of the arrow 4. By means of a fan 5, said gases are then driven out into the chimney through a channel connected to the casing 2 at the opening 6. By means of the fan 7, air is forced into the pre-heating device in known manner, in the direction of the arrow 8, passing through the rotor 3 in the casing 2 on the other side of the partitions 9 and 10. The channel through which the pre-heated air passes to the furnace is connected to the casing at the opening 11. The rotor consists in known manner of a cylindrical frame divided into segments by means of radial partitions, the regenerative material being placed in said segments in any suitable manner. At the ends of the partitions 9 and 10 adjacent to the rotor there are provided parts which can entirely cover such a segment formed by the radial partitions of the rotor, for the purpose of preventing the different fluids from passing from the one channel into the other, in case such a partition 9 or 10 would stand right above such a segment. Hitherto, no special packing means have been used, provided the partitions 9 and 10 are so adjusted in relation to the rotor as to bring about a play as small as possible. In the same manner the tightening of the rotor has been effected at its outer periphery against the casing. In case of special packing means being used, a plate shaped as a segment of the rotor has been forced against the rotor by its own weight or by means of weights or springs.

According to the present invention, the rotor is adjusted as exactly as possible in the casing 2 and the inevitable plays arising thereby are tightened by plates or projecting edges arranged on the rotating and/or the stationary parts, said edges being so placed as to be ground off by friction against the opposite parts, thus becoming sufficiently large for effective tightening. In Figs. 1 and 2 such tightening means are shown on all the radial partitions as at 13, and at the outer periphery of the rotor as at 14. In the embodiment shown, such tightening or packing means consist of thin plates which are given such a shape as to be bent backwards in the direction of rotation designated by the arrow 16.

In Figs. 3 and 4 details of such tightening or packing means are shown on an enlarged scale, Fig. 3 illustrating a section on the line 3—3 through a radial partition of the rotor at the moment when said partition passes beneath the segment plates 17 and 18 of the walls 9 and 10. Assuming that the rotor revolves in such direction that the wall will move in the direction of the arrow 20, it is seen that the packing edges 21 and 22 consisting of plates fixed by means of bolts or rivets effect tightening in such a way as to leave a small or no play at the plates 17 and 18.

In Fig. 4, it is shown how the outer mantle of the rotor is arranged in relation to the casing 2. At 24, it is shown how a bent plate is fixed to the casing 2, and adapted to abut against the upper surface of the rotor with axial tightening, whereas at 25, it is disclosed how a plate which is also fixed to the rotor casing 2 abuts against the rotor in a radial direction. Assuming that the rotor is mounted in the casing in such a way that the rotor touches or nearly touches the stationary parts with the packing or tightening means, then it is evident that during the rotation the portions of the tightening or packing edges which abut more forcibly than is necessary will be ground off if the plates are properly dimensioned. By expansion due to variations in temperature the edges may be ground off further, until the rotor fits between the tightening or packing means, in such a way as to bring about a play as small as possible between the stationary and the rotating parts. It is evident that the said tightening means should be so arranged that variations in temperature within the apparatus will not have such influence upon the expansions of the rotor that the tightening edges will leave the part against which they are intended to fit tightly. As will be seen from Fig. 4, the tightening means as shown at 25 is less suitable, if it is assumed that an increase of temperature within the rotor causes an increase of the diameter of the rotor, in which case the wall 23 in this figure moves to the left and leaves the tightening edge 25. By arranging the tightening edge as shown at 24, such variations in the radial direction may arise without causing any deterioration of the tightening.

When arranging the tightening means on the rotor as shown at 14 in Fig. 1 a radial expansion of the rotor is permitted, without deterioration of the tightening. However, the rotor in operation may assume an inclined position, being subjected to variations in temperature and not having the same temperature in all its portions. Here it may occur, that the tightening means will be so ground off on the rotor passing for instance through the hot channel, that no effective tightening is obtained when the rotor passes through the cold channel. For this reason the tightening means particularly at the periphery of the rotor, are arranged on the stationary parts. On the contrary, the tightening means causing a tightening effect between the different channels always abut against the same parts as shown in Fig. 3, and are more easily ground off for proper positions.

As described above, tightening means may, according to the invention, not only be arranged between the different channels, but also used for the purpose of preventing the different gases from passing outside the rotor as shown in Fig. 4. As it is possible by tightening means, on the one hand to prevent gas from passing from the one channel into the other, and on the other hand to prevent such gas from passing outside the rotor, it is evident that the work of the fans may be decreased, thus increasing the efficiency of the apparatus. In spite of the heating device described above giving a high efficiency, it is of course desirable to increase said efficiency by decreasing the power required for driving the rotor and the fans, this being especially the case in plants where the cost of power is high. The apparatus is preferably driven by an electric motor, permitting a control of the device independently of other elements of the boiler plant.

It is evident that the invention may be modified in several respects without departing from its main principles, the embodiments described above being merely examples. So for instance similar means may be used in pre-heating devices in which a greater number of passages are arranged in the casing 2 than described above. Furthermore the invention is independent of the manner in which the tightening edges are produced. The edges may, consequently, be made integral with the apparatus, or they may consist of plates or the like welded or riveted on to said apparatus. However, said edges preferably consist of plates removably fixed onto the parts in question for instance by means of bolts or the like, thus permitting replacement of the tigthening edges when for some reason or other they have been ground off too much.

What I claim as new and desire to secure by Letters Patent of the United States of America is:—

1. Packing means in regenerating heating devices, in which heat is transmitted from a fluid yielding heat to another fluid receiving heat and in which the regenerative material on the one hand and inlet and outlet for the two fluids on the other hand move in relation to each other, said packing means comprising thin lips fixed on one of the parts moving in relation to each other, said lips projecting against the opposite part and being adapted to extend substantially beyond the play spaces between said parts.

2. Packing means in regenerative heating devices in which heat is transmitted from a fluid yielding heat to another fluid receiving heat and in which the regenerative material on the one hand and inlet and outlet for the two fluids on the other hand move in relation to each other, said packing means comprising thin lips fixed on one of the parts moving in relation to each other and consisting of sheet metal, said lips projecting against the opposite part and being adapted to extend substantially beyond the play spaces between said parts.

3. Packing means in regenerative heating devices in which heat is transmitted from a fluid yelding heat to a heat absorbing fluid and in which a cylindrical frame containing regenerative material is surrounded by a casing and is rotatably mounted so as to be passed by the two fluids, said packing means comprising thin lips fixed on the rotating frame and projecting against the surrounding casing and being adapted to be ground off during rotating by contacting against the casing.

4. Packing means in regenerative heating devices in which heat is transmitted from a fluid yielding heat to another fluid absorbing heat and comprising a rotating cylindrical frame, radial walls in said frame dividing same into sector-shaped compartments, regenerative material placed in said compartments, a casing surrounding said frame, partitions on either side of said frame dividing the casing into two passages one for each of the fluids, said packing means comprising thin lips fixed on the radial walls and on the outer periphery of said frame and projecting against the partitions of said casing and against said casing itself respectively and being adapted to be ground off during rotation by friction against said partitions and casing.

5. Packing means in regenerative heating devices, in which heat is transmitted from a fluid yielding heat to another fluid receiving heat and in which the regenerative material on the one hand and inlet and outlet for the two fluids on the other hand move in relation to each other, said packing means comprising thin lips consisting of plates of sheet metal fixed on one of the parts moving in relation to each other by means of screw bolts, said lips projecting against the opposite part and being adapted to extend substantially beyond the play spaces between said parts.

In testimony whereof I affix my signature in presence of two witnesses.

FREDRIK LJUNGSTRÖM.

Witnesses:
IVAN FALK,
JOHN E. ULIDEIC.